Patented July 24, 1951

2,561,325

UNITED STATES PATENT OFFICE 2,561,325

ULTRAVIOLET TRANSMITTING GLASS

James Earle Duncan, Brackenridge, Pa., assignor to Pittsburgh Plate Glass Company, Allegheny County, Pa., a corporation of Pennsylvania No Drawing. Application June 26, 1948,
Serial No. 35,532

2 Claims. (Cl. 106—54)

The present invention relates to glass compositions and more particularly to a glass which has a high transmission value for light rays of shorter wave lengths, the so-called ultraviolet light rays.

It is well recognized that glass permeable to ultraviolet light has a growing demand in modern commerce. Quartz glass, regarded as the superior medium for ultraviolet light transmission, is difficult to prepare and fabricate. Meta phosphate glasses, having only slightly inferior transmission characteristics, are unacceptable to many applications because of high water solubility. Other glasses, possessing a satisfactory transmission value initially, are not stable and the transmission factor decreases with exposure.

It is one object of my invention to provide a glass which possesses the desirable property of ultraviolet light transmission while at the same time is free from the ordinary disadvantages inherent to such glasses.

I have found that a glass composition which normally absorbs a major portion, if not all the light rays in the ultraviolet portion of the solar spectrum, can be rendered permeable to those rays by the inclusion therein of a small percentage, generally less than ½ of 1 percent of cadmium sulfide. The cadmium sulfide content of the glass can be procured by the addition of cadmium sulfide per se to the batch or another compound of cadmium together with sufficient sulfur to insure its conversion into cadmium sulfide may be employed. Under certain conditions, it may be found to be desirable to include some sulfur with the cadmium sulfide to prevent or at least to counteract possible decomposition of the cadmium sulfide during the melting process.

A conventional glass which consists essentially of silica and the oxides of sodium, potassium, calcium, boron and zinc, the $SiO_2$ being from 55 to 70%, the total alkali metal oxides from 13 to 20%, the calcium oxide from 5 to 10%, the boric oxide from 3 to 6% and zinc oxide from 1 to 5%, is generally considered to absorb the ultra violet light of the solar spectrum. Actually, glasses having compositions within the specified ranges, will transmit a small amount of the ultra-violet light but the transmission factor is so slight as to be valueless. For example, the transmission of light rays of 290 millimicrons wave length through 2 millimeters of standard glass, amounts to less than 1.5 per cent.

The inclusion of from 0.2 to 0.6 percent of cadmium sulfide in the glass, greatly enhances the ultra violet light transmitting properties of the glass, without affecting the other properties thereof. The cadmium sulfide content is critical, for with amounts outside the specified range, the transmission characteristics change radically. In fact, cadmium sulfide in larger amounts has been used in the formation of an ultraviolet absorbing glass.

A typical example of a glass batch illustrative of my invention, together with its calculated composition is:

| Ingredient | Batch, Parts by Weight | Composition Per Cent |
|---|---|---|
| Sand | 1,000 | $SiO_2$ ———— 66.26 |
| Sodium carbonate | 319 | $Na_2O$ ———— 12.25 |
| Pottassium carbonate | 113 | $K_2O$ ———— 5.00 |
| Calcium carbonate | 200 | $CaO$ ———— 7.38 |
| Boric acid | 150 | $B_2O_3$ ———— 5.60 |
| Zinc oxide | 50 | $ZnO$ ———— 3.31 |
| Cadmium sulfide | 3 | $CdS$ ———— .20 |

This batch produces a clear, substantially colorless glass which is readily fabricated into desired forms. The transmission of light rays of 290 millimicrons wave length through 2 millimeters of this glass, is approximately 16%. It will transmit 39% of the light rays of 300 millimicrons wave length.

What I claim is:

1. A substantially colorless glass, permeable to ultra violet light rays of the solar spectrum, which contains from 55 to 70% of silica, 13 to 20% of sodium and potassium oxides, 5 to 10% of calcium oxide, 3 to 6% of boric oxide, 1 to 5% of zinc oxide and from 0.2 to 0.6 percent of cadmium sulfide.

2. A substantially colorless glass, permeable to ultra violet light rays of the solar spectrum, having the following composition:

| | Percent |
|---|---|
| $SiO_2$ | 66.26 |
| $Na_2O$ | 12.25 |
| $K_2O$ | 5.00 |
| $CaO$ | 7.38 |
| $B_2O_3$ | 5.60 |
| $ZnO$ | 3.31 |
| $CdS$ | .20 |

JAMES EARLE DUNCAN.

REFERENCES CITED

The following references are of record in the file of this patent:

UNITED STATES PATENTS

| Number | Name | Date |
|---|---|---|
| 1,536,920 | Parkinson | May 5, 1925 |